United States Patent [19]

Sheriff

[11] Patent Number: 5,234,077

[45] Date of Patent: Aug. 10, 1993

[54] HUNTING TREE STAND

[76] Inventor: Tony Sheriff, 5871 Cool Springs Rd., Gainesville, Ga. 30506

[21] Appl. No.: 834,143

[22] Filed: Feb. 10, 1992

[51] Int. Cl.$^5$ .............................................. A47C 9/10
[52] U.S. Cl. .................................. 182/187; 182/135; 182/136
[58] Field of Search .............. 182/187, 188, 134, 135, 182/136; 108/152

[56] References Cited

U.S. PATENT DOCUMENTS

| | | |
|---|---|---|
| 3,485,320 | 12/1969 | Jones . |
| 3,960,240 | 6/1976 | Cotton . |
| 4,130,180 | 12/1978 | Ferguson et al. ................. 182/187 |
| 4,137,995 | 2/1979 | Fonte . |
| 4,244,445 | 1/1981 | Strode . |
| 4,316,526 | 2/1982 | Amacker . |
| 4,331,216 | 5/1982 | Amacker . |
| 4,452,338 | 6/1984 | Untz . |
| 4,488,620 | 12/1984 | Gibson . |
| 4,726,447 | 2/1988 | Gibson et al. . |
| 4,802,552 | 2/1989 | Williams . |
| 4,834,217 | 5/1989 | Manes . |
| 4,942,942 | 7/1990 | Bradley . |
| 4,969,538 | 11/1990 | Amacker . |
| 4,987,972 | 1/1991 | Helms . |
| 4,997,063 | 8/1991 | Bradley . |

*Primary Examiner*—Alvin C. Chin-Shue
*Attorney, Agent, or Firm*—James A. Hinkle

[57] ABSTRACT

A dual frame hunting tree stand has a tree stand top (1) and a tree stand bottom (2). Each has a tree engagement member (4) attachable to tree hugging arms (6) extendable pivotally from opposite sides of bottom and top frames (8 and 9). A tree piercing prong (5) is attached rigidly in triangular corner bracing relationship to each side (16) of the inside end (15) of each frame (8 and 9). A desirably sharp distal end (13) of each tree piercing prong (5) is positioned to point towards a center of a tree (3) of average diameter for climbing. Seating (14, 52 and 53), arm rests (54), level adjusters (25, 26, 51 and 56), feet straps (10 and 11), backpack straps (27), selective tree grabbing elements (46, 59, 60 and 61), selective floor surfaces (7, 47 and 57) for the stands and other features are made possible in more advantageous forms as a result of unique structure of this invention.

36 Claims, 5 Drawing Sheets

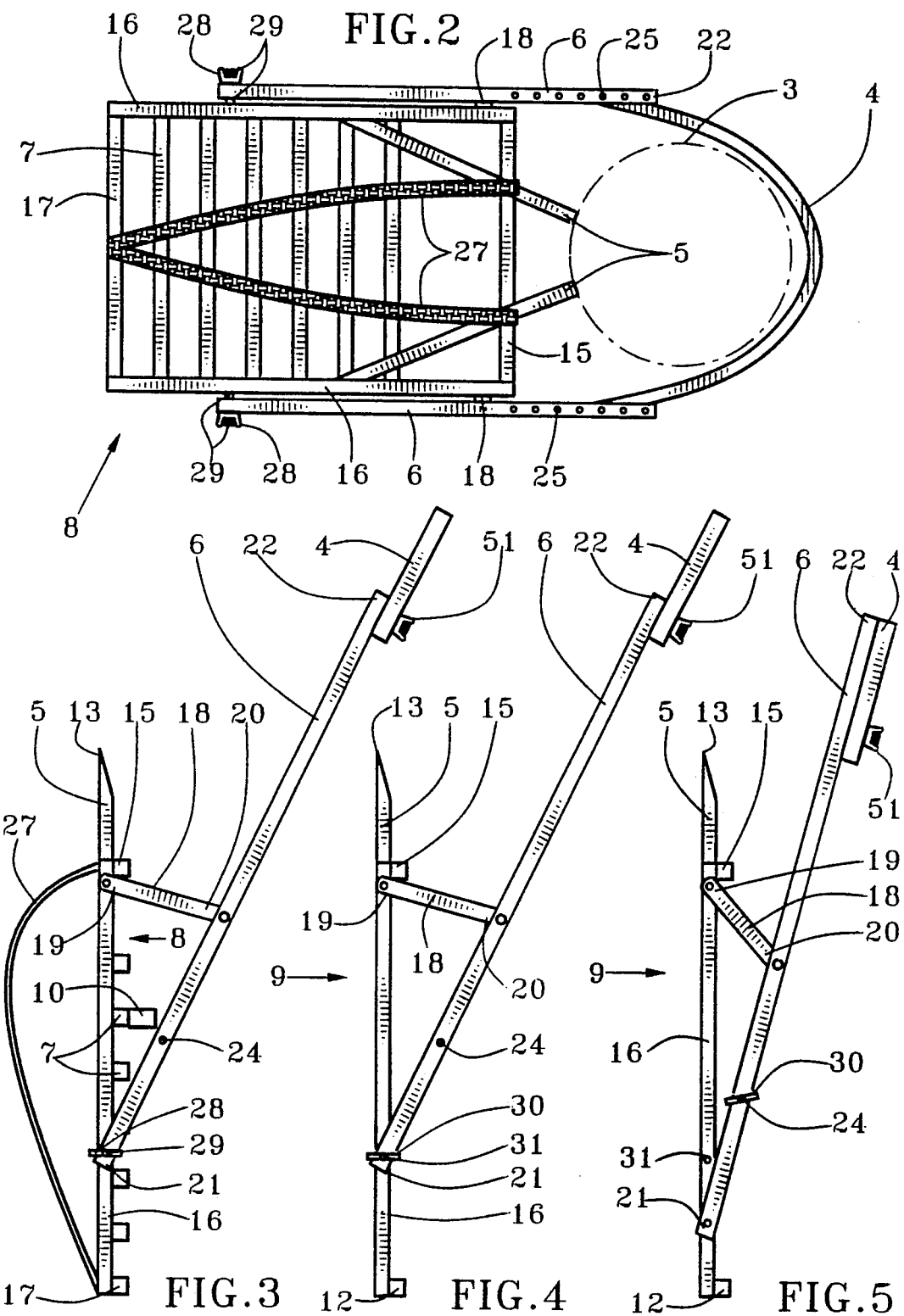

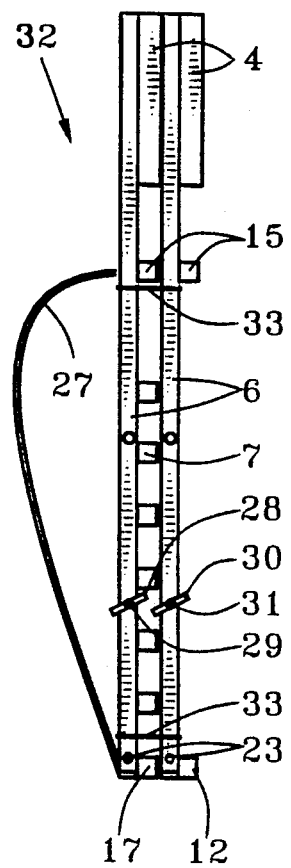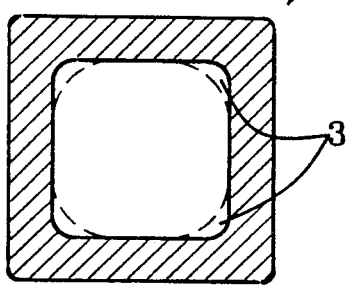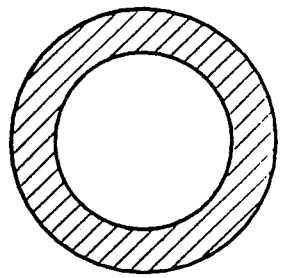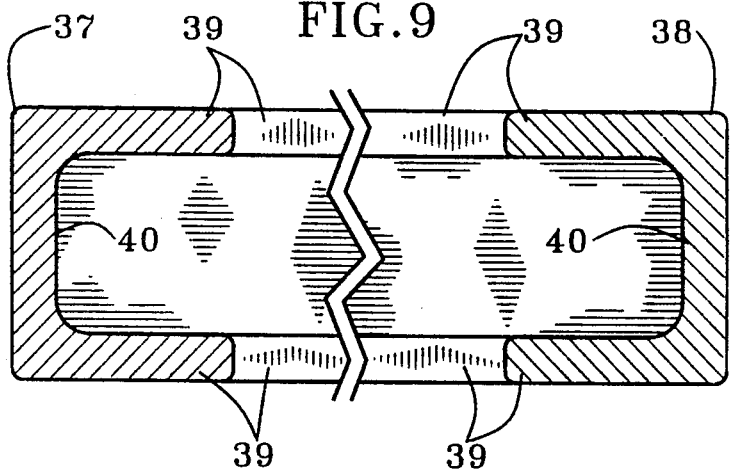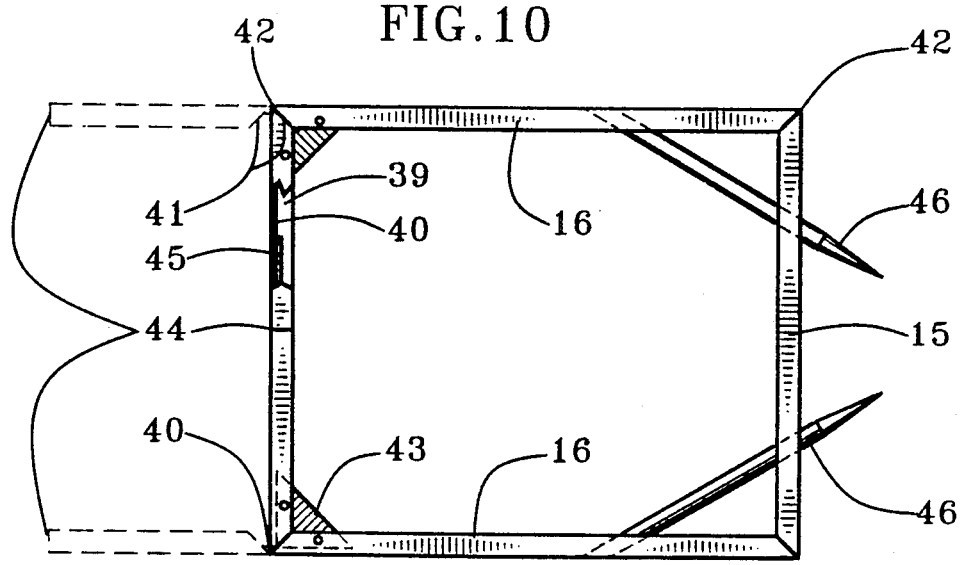

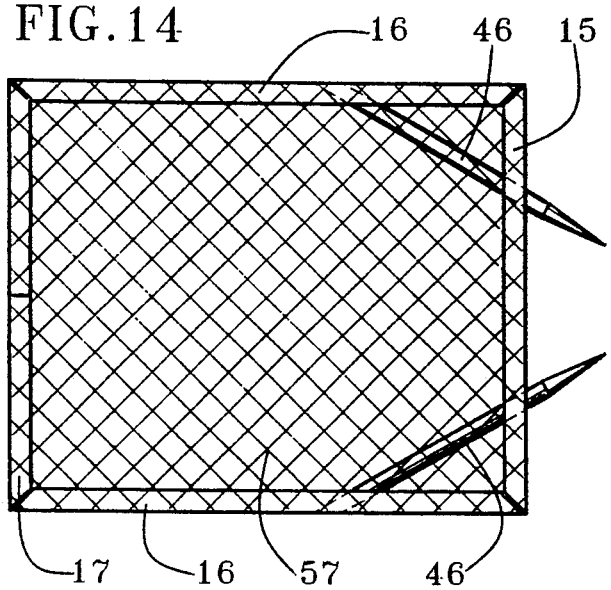
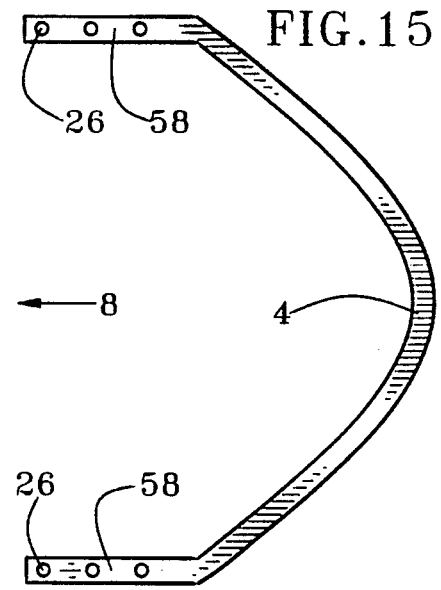
FIG. 14
FIG. 15
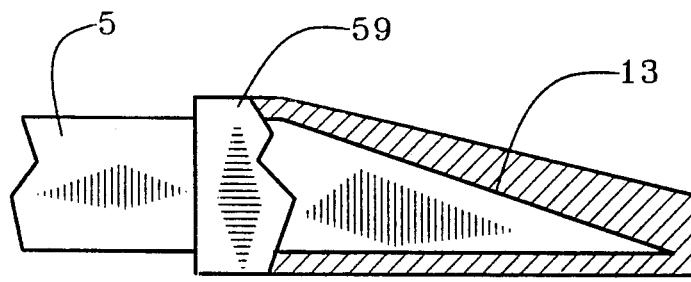
FIG. 16
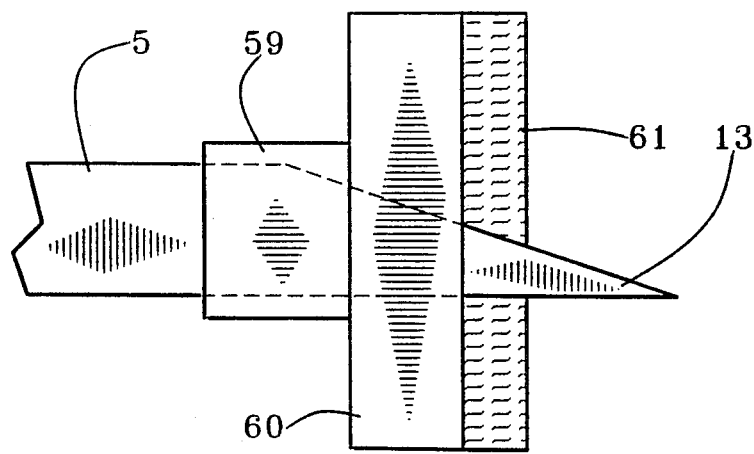
FIG. 17

HUNTING TREE STAND

BACKGROUND OF THE INVENTION

I. Field of the Invention

The present invention relates generally to the field of hunting tree stands with which hunters, wildlife photographers or other observers can climb trees in order to position themselves in an observation position where they will not be seen by animals as a threat to scare them from coming near. In particular, it is a dual frame tree climbing tree stand with tree spikes which form triangular shapes for rigidity of the stands and also form effective angles of entry of the tree spikes into trees of different diameters. Related features result in ease of packing, low weight, convenience of use, comfort and other advantages.

II. Description of the Prior Art

There are a wide variety of successful dual frame hunting tree stands in use. This invention, however, has different structure and working relationships of parts that provide advantages previously unavailable.

Examples of different but pertinent prior art include the following United States patent documents:

| U.S. PAT. NO. | DATE | NAME | CLASSIFICATION |
| --- | --- | --- | --- |
| 4,997,063 | Mar. 5, 1991 | Bradley | 182/187 |
| 4,492,942 | Jul. 24, 1990 | Bradley | 182/187 |
| 4,969,538 | Nov. 13, 1990 | Amacker | 182/187 |
| 4,331,216 | May 25, 1982 | Amacker | 182/135 |
| 4,316,526 | Feb. 23, 1982 | Amacker | 182/135 |

The Bradley U.S. Pat. No. 4,997,063 had a conventional turnbuckle means for leveling both frames of dual frame hunting stands, a conventional net bottom frame and a seat for the top frame different from those provided as optional embodiments of this invention. They are used in different working relationships of parts. The turnbuckle in the Bradley U.S. Pat. No. 4,997,063, for example, was employed in relationship to a pin hinged anchor rather than an angled prong anchor as employed in this invention. The structure of this invention is different for its different working relationships of parts.

The Bradley U.S. Pat. No. 4,492,942 had a still different means for leveling a frame. A central leveling yoke was adjusted with a leveling pin with a different form than used for different embodiments of this invention.

The Amacker U.S. Pat. No. 4,969,538 taught a triangular structure for attachment of tree hugging braces, but they were not foldable differently for backpacking mode and operational mode as provided by this invention.

The Amacker U.S. Pat. No. 4,331,216 employed tree engaging prongs that were directed towards centers of trees differently than provided by this invention. They were not ends of structural members that provide structural rigidity as in this invention.

The Amacker U.S. Pat. No. 4,316,526 employed tree engaging prongs that were directed towards centers of trees for maximizing grasping efficiency in a different way than this invention. It decreased rather than increased structural integrity.

SUMMARY OF THE INVENTION

It is contemplated that the primary objective of this invention is to provide a hunting tree stand having structure and working relationships of parts which improve all other aspects of hunting tree stands.

Specific objectives made possible with this invention include greater structural integrity, higher safety, more carrying convenience, lower weight, greater tree hugging capacity, adaptability to laws concerning tree climbing equipment in different jurisdictions, climbing convenience, protection against spreading of tree diseases, comfortable arm rests for handling hunting and photography equipment and, greater comfort of climbers while waiting for objects of their tree climbing to occur.

This invention accomplishes the above and other objectives with a dual frame hunting tree stand having a top frame and a bottom frame. Each frame has a tree engagement member attachable to tree hugging arms extendable pivotally from opposite sides of the frames. A tree piercing prong is attached rigidly in triangular corner bracing relationship to each side of the inside end of each frame. A desirably sharp distal end of each tree piercing prong is positioned to point towards a center of a tree of average diameter for climbing. Seating, arm rests, level adjusters, feet straps, backpack straps, backpack adjustments, selective tree grabbing elements, selective floor surfaces for the stands and other features are made possible in more advantageous forms as a result of unique structure of this invention.

Other objects, advantages and capabilities of the invention will become apparent from the following description taken in conjunction with the accompanying drawings showing preferred embodiments of the invention.

BRIEF DESCRIPTION OF THE DRAWINGS

FIG. 2 is a bottom view of a tree stand bottom in operational relationship to a tree;

FIG. 3 is a side view of a tree stand bottom in operational mode;

FIG. 4 is a side view of a tree stand top in operational mode;

FIG. 5 is a side view of tree stand top in readjustment between operational and backpack modes;

FIG. 6 is a side view of both a tree stand top and a tree stand bottom tied together and standing in backpack mode;

FIG. 7 is a cross section of a square tube used for construction of a preferred embodiment of this invention;

FIG. 8 is a cross section of a round tube that can be used for construction of optional embodiments of this invention;

FIG. 9 is a cutaway cross section of assembled channel rod used for construction of embodiments of this invention with particularly light weight per strength;

FIG. 10 is a cutaway top view of a rectangular frame with an optional construction method using channel rod before being made into a rectangular bottom frame with a floor or a rectangular top frame with a seat and other options;

FIG. 14 is a top view of a light weight embodiment rectangular bottom frame having a relatively rigid mesh floor;

FIG. 15 is a top view of an optional tree engagement member having attachment arms for use with wide tree stands for climbing large diameter trees;

FIG. 16 is a cutaway sectional side view of a tip of a tree piercing prong having a replaceable cover for variation of sharpness of the tree piercing prong and for sanitation as may be required for various jurisdictions and as may be desired for various types of trees; and FIG. 17 is a cutaway sectional side view of a tip of a tree piercing prong having a replaceable cover for variation of penetration and for soft surface contact with trees as may be required for various jurisdictions and as may be desired by particular individuals.

DESCRIPTION OF PREFERRED EMBODIMENT

Figure 1:
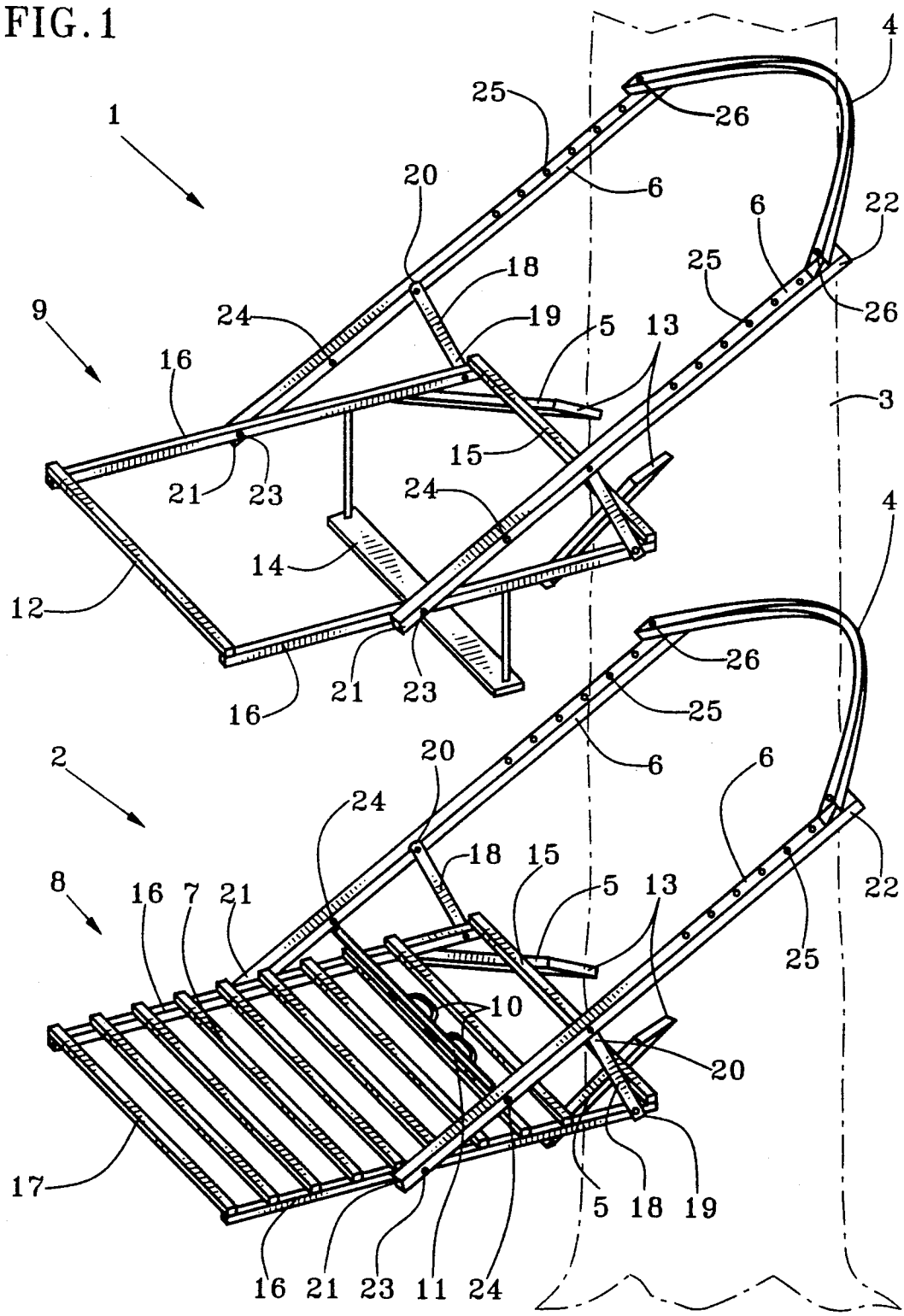
FIG. 1 is a perspective view of the invention mounted to a bottom of a tree to be climbed.

Referring to the drawings wherein like reference numerals designate corresponding parts throughout the several figures, a tree stand top 1 and a tree stand bottom 2 are employed in combination to climb tree 3. Tree engagement members 4 are positioned at an opposite side of the tree 3 from tree piercing prongs 5 and attached to tree hugging arms 6 in the same manner for the same components on the tree stand top 1 and the tree stand bottom 2, but with the tree stand top 1 positioned above the tree stand bottom 2 as illustrated in FIG. 1.

A climber then stands on floor 7 of rectangular bottom frame 8 with rectangular top frame 9 cradling the climber at approximately waist height. Feet of the climber are then positioned in toe straps 10 with a heel strap 11 positioned behind heels of the climber. Sitting on an outside end 12 of rectangular top frame 9, the climber then raises the tree stand bottom to a higher level with the climber's feet under the toe straps 10. The tree piercing prongs 5 pierce the tree 3 at the higher level as a result when weight of the climber is again positioned on the floor 7. Piercing of the tree 3 results form lever action of the rectangular bottom frame 8 on the tree piercing prongs 5 with tree 3 forming a fulcrum of a class two lever.

The tree piercing prongs 5 can be provided with an upwardly bevelled point 13. This allows upward exit of the tree piercing prongs when being lifted and withdrawn repeatedly for climbing. This decreases workload and adds convenience of the lifting step of tree climbing.

When a desired height in a tree is reached, a climber can then adjust height of tree stand top 1 above tree stand bottom 2 to allow the climber's feet to rest on floor 7 when the climber is sitting on swing board seat 14. Rectangular top frame 9 then serves as safety restraint from falling. It also provides an arm rest for shooting weapons or for steadying photographic equipment.

Distinct advantages of this invention over other tree climbing stands are provided by structural rigidity of the respective frames 1 and 2 with the tree piercing prongs 5. It saves weight for the tree piercing prongs 5 to be tree grasping members and to form a second function of triangular braced relationship between inside ends 15 and sides 16 of frames 1 and 2. Tree piercing is more reliable and the frame is more rigid without extra weight. This allows other features to be added without excessive weight when weight is critical.

One of the added features of this particular embodiment is use of square tube construction. It provides high strength and high rigidity for the floor 7. Without the triangular based relationship of the tree piercing prongs 5, the square tube construction would be much heavier. Also, it would be harder to operate without the upwardly bevelled tree piercing prongs 5.

The tree hugging arms 6 are held in an upwardly angled relationship to rectangular bottom frame 8 and rectangular top frame 9 by an arm brace 18, preferably a metal strap, having a proximal end 19 pivotally attached to each side 16 near the inside ends 15 of the respective frames 8 and 9. A distal end 20 of the arm braces 18 is pivotally attached to the tree hugging arms 6 at a select position between a proximal end 21 and a distal end 22 of the tree hugging arms 6.

The tree hugging arms 6 are attachable to sides 16 of the frames 8 and 9 at an operational mode attachment orifice 23 for operation and at a packing mode attachment orifice 24 for backpacking and storage. Distance between orifice 23 and orifice 24 is proximate the distance between pivotal attachment of the proximal end 19 of the arm braces 18 to the frames 8 and 9 and the pivotal attachment of the distal end 20 of the arm braces 18 to the tree hugging arms 6 respectively for tree stand top 1 and tree stand bottom 2. Consequently, tree hugging arms 6 are parallel to frame sides 16 in packing mode and form a desired angle of attachment for operational mode.

The tree engagement members 4 can be attached to the tree hugging arms 6 at different distances from distal ends 22 of the tree hugging arms 6. This compensates for different diameters of trees 3 to be climbed. For larger diameter trees 3, the tree engagement members 4 are attached nearer the distal ends 22. Conversely, for trees with smaller diameters, the tree engagement members are attached further away from the distal ends 22. Arm attachment orifices 25 with incremental spacing in the tree hugging arm 6 and engagement member orifices 26 are provided for this variable attachment aspect.

One additional concern presents itself when the present invention is used with small diameter trees. It is quite possible that the tree piercing prongs 5 may be spaced too far apart to adequately impale the tree. In such an event, it is contemplated that a blade strip (not shown) may be placed across the prongs 5 distanced back from the prong points to prevent the tree from sliding into the gap between the prongs.

Referring now to FIGS. 1 and 2, backpack straps 27 are attachable to the inside end 15 of the rectangular bottom frame 8 at a shoulder end of the backpack straps 27 and to the outside end 17 at a waist end of the backpack straps. The tree piercing prongs 5 are positioned to enter tree 3 in a direction of its approximate center in order to achieve a firm contact and to be disengaged easily. This angle of entry also prevents tree bark from being pushed off at an angle. Wing nuts 28 on frame bolts 29 or other easy means of attachment are used to change attachment of the tree hugging arms 6 to the frame sides 16 between operational mode and packing mode orifices 23 and 24 respectively a shown in FIG. 1.

Referring to FIGS. 3–5, a tree stand top 1 and a tree stand bottom 2 in upright attitude show the backpack straps 27 in approximate attitude for packing when folded to packing mode. Both the top 1 and the bottom 2 are folded and unfolded the same. In FIGS. 3 and 4, wing nuts 28 and 30 are attached to respective frame bolts 29 and 31 to hold the respective frames 8 and 9 and the tree hugging arms 6 at desired angles for operational mode. In FIG. 5, the wing nut 30 is positioned at packing mode attachment orifice 24 where it will be attached to frame bolt 31 to hold the tree hugging arms 6 and the frame 8 and 9 parallel for the packing mode. Also in FIG. 5, the tree engagement member 4 has been reversed on the tree hugging arms 6 to decrease overall length for packing and storage.

Referring to FIG. 6, a backpack unit 32 is formed by tying tree stand top 1 and a tree stand bottom together in the packing mode with the backpack straps 27 at an opposite side from the tree stand top 1. The wing nuts 28 and 30 are fixed onto respective frame bolts 29 and 31 at the packing mode attachment orifices 24 to hold each unit in the packing mode with frames 8 and 9 parallel to tree hugging arms 6. From a side of the backpack unit 32, the tree hugging arms hide the frames 8 and 9 except for portions which protrude from the frames. For the embodiments in this illustration, only the floor 7 and ends 12, 15 and 17 of the frames are visible. Tie down straps 33 of various sorts can be employed to tie the top and bottom of the tree stand together. Rubber tie down straps used for motorcycle luggage tie downs are recommended for tie down straps 33. They can be hooked from side to side of tree hugging arms 6 and over either opposite portion of the stand respectively. The tree engagement members 4 are in reverse attachment as illustrated in FIG. 5.

Referring to FIG. 7, square tubing 34 can be used for a square tube embodiment of this invention. Typically, high tensile aluminum alloys with a high tensile temper would be used. Size of the tubing 34 for most units would be three quarter inch squares with one eighth inch walls. Slightly higher strength can be achieved with slightly thicker walls. More advantageous than thicker walls for higher strength is thicker corners 35. Thicker corners allow use of bolts without decreasing either tensile or bending moment strength. Larger squares with thinner walls and thicker corners 35 would provide the best trade off for increasing strength for more sturdy models that may be desired by some individuals. If the square tubes are bent severely or welded, it will be necessary to re-temper the material. In the event of aluminum welding, therefore, it is advisable to start with untempered metal and heat treat it after welding.

Referring to FIG. 8, round tubing 36 also may be used. It is particularly good for round bent corners of the frames 8 and 9. It would be best used with a floor made of flexible mesh. However, it would require heat treatment after bending. It is best, therefore, start with untempered material.

Referring to FIGS. 9 and 10, the type of beam or rod with highest strength per weight for the frames 8 and 9 is a channel beam. It also provides easiest construction of frames 8 and 9. Channel beams 37 and 38 in oppositely disposed relationship form a rectangular tube effect with the channel walls 39 at wide sides and channel bottoms 40 at narrow sides.

Construction of a frame 8 or 9 can be accomplished successfully and efficiently by first cutting 90 degree tapered grooves 41 in a straight channel beam where corners 42 are desired. Wall 40 which remains after the groove is cut is then bent 90 degrees. If the corners 42 are bolted to a corner plate 43 and if beam ends 44 are bolted to an inside plate 45, then heat treating is not required because the type of bending would not deteriorate a temper significantly. Then, also, square tube tree piercing prongs 5 shown in FIGS. 1–5 can be bolted on with good results.

However, if welding and heat treatment are employed for lower weight and less labor with high volume, then the corners 42 can be welded, the ends 44 can be welded and round tree piercing prongs 46 can be welded into slanted orifices in channel bottoms 40 at inside end 15. If the advantages of square rod prongs 5 are desired, they can be set screwed onto round prongs 46 as an option. Owing to advantages of square prongs 5, round prongs 46 can be provided without points and square prongs or various prong attachments can be added permanently or replaceably as desired.

This frame, with either welded or bolted construction, is amenable to square tube floor 4 or whatever floor may be desired. It is particularly good for square tube floors 4 because shorter bolts with less weight can be used.

Regardless of which type of beam is used for frames 8 and 9, however, the most advantageous type of beam for the tree hugging arms 6 is a square tube beam 34. It is discussed in relation to FIG. 7 and illustrated in FIGS. 1–5 and in all other illustrations of tree hugging arms 6.

Figure 11:
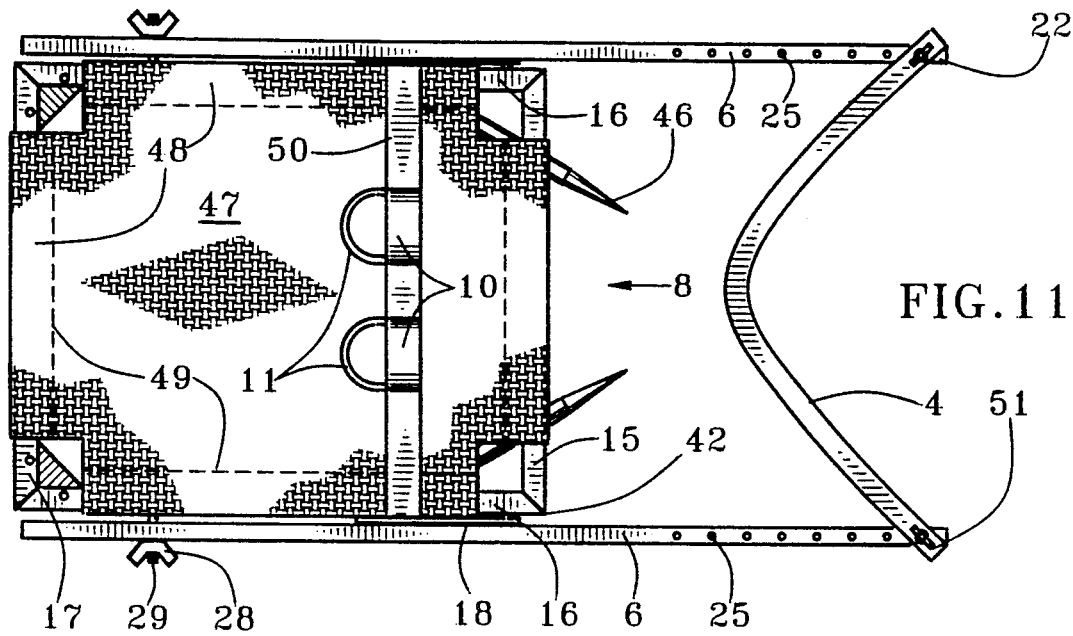
FIG. 11 is a top view of a lightweight embodiment of a tree stand bottom constructed with channel rod and having a mesh floor. It is folded in backpack mode with a tree engagement member reversed to decrease carrying size.
Figure 12:
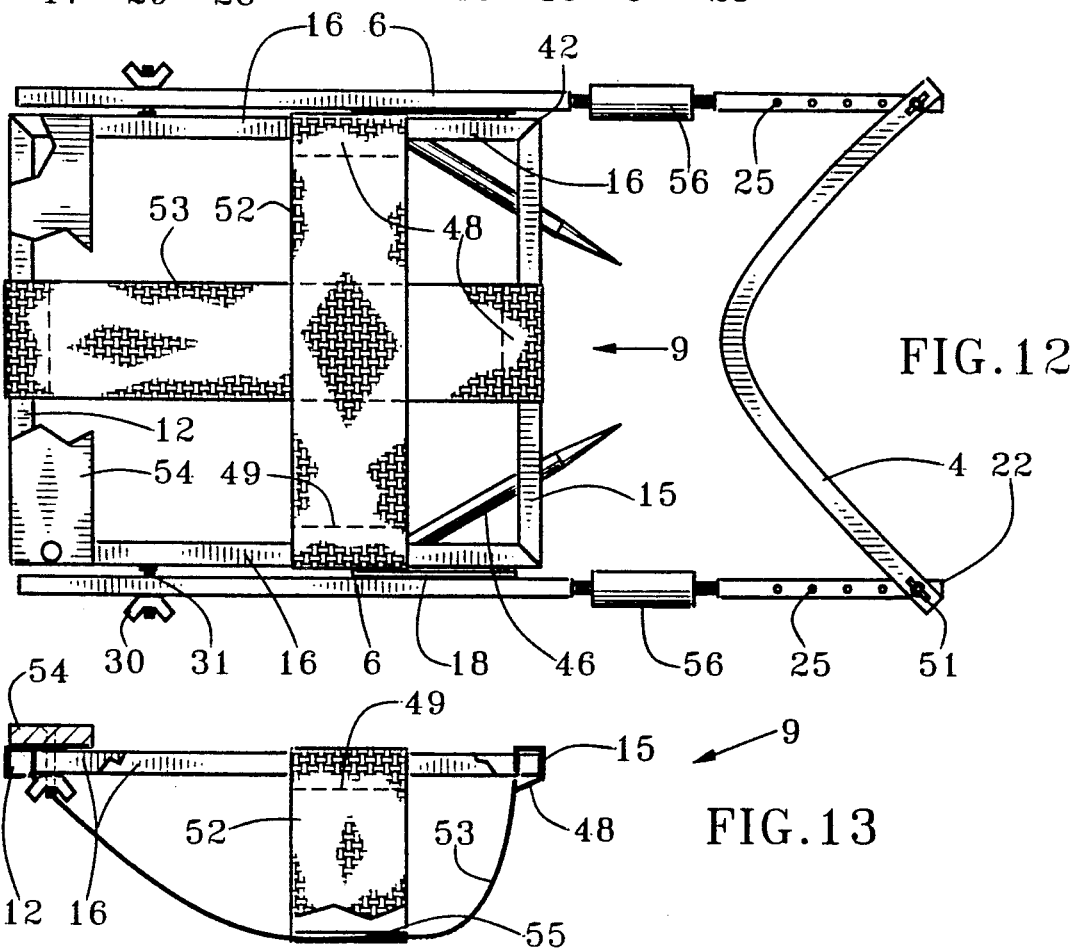
FIG. 12 is a top view of a channel rod embodiment of a lightweight tree stand top having a four-way safety lounge chair and round handled turnbuckles for convenient and accurate leveling adjustment. It also is folded in backpack mode and has a tree engagement member reversed to decrease carrying size.
Figure 13:
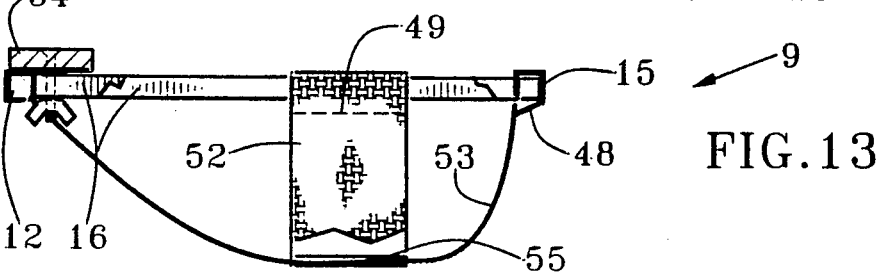
FIG. 13 is a cutaway side view of the FIG. 12 tree stand stop showing adjustability of the four-way safety lounge chair.

Referring to FIGS. 11–13, an ultra light bottom frame 8 with channel beam construction, discussed for FIGS. 9–10, can be provided with a high tensile fiber mesh floor 47 stretched from end-to-end and from side-to-side of frame 8 with either welded or bolted corners 42. The mesh floor 47 can be attached with loops 48 sewn with stitching 49. Although such a floor is sufficiently tight and inflexible for toe straps 10 and heel straps 11 attached directly to it, a rigid harness piece 50 can be attached to sides 16 for a more rigid attachment of toe strap 10 and heel strap 11.

In FIGS. 11 and 12, the top and bottom stands 1 and 2 respectively are in the packing mode. The arm braces 18 are parallel to sides 16 and to tree hugging arms 6. Wing nut 28 is on frame bolt 29 at a packing mode attachment orifice (FIGS. 1–5) and tree engagement member 4 is attached in reverse relationship. Arm wing nuts 51 can be employed for ease of changing tree engagement member 4 to different arm attachment orifices 25 and for ease of reversing attachment for packing mode.

In FIG. 12, an ultra comfortable and yet ultra light top frame seating is provided. A side-to-side fiber lounge chair 52 can be loop suspended from sides 16. In this form, lounge chair 52 can be positioned from end-to-end of the top frame 9. For facing away from a tree 3, it would be positioned near the inside end 15. For facing towards the tree 3, it would be positioned nearer the outside end 12 as desired. A four-way safety lounge chair can be provided by adding end-to-end fiber lounge chair 53. Either lounge chair 52 or 53 can be used separately. Either or both can be attachable with buckle straps or other means for selectivity of use.

High safety and yet unrestrictive and convenient use can be provided by positioning legs of a user on opposite sides of whichever lounge chair is in the direction the user desires to face. The user leans against the opposite side from which the user's legs are extended. This is particularly advantageous for longtime waiting of hunters, photographers and others who use tree climbers. More people can use them when they are this safe, light, comfortable and convenient.

An end seat or armrest platform 54 can be attachable to either end 12 or 15 of top frame 9. When attached to the outside end 12, it is comfortable for sitting on when lifting the tree stand bottom 2. When waiting, it can be used for either a table for eating or for an arm rest or equipment rest as desired. It can be attachable with a wing nut fastener similar to that used for frame bolts 29 and 31.

In FIG. 13, a hanging relationship of the lounge chairs 52 and 53 is apparent. One can be positioned on top of the other. Preferably, the side-to-side lounge chair 52 is positioned on top of the end-to-end lounge chair 53 and a sewed chair loop 55 is provided. The sewed chair loop keeps chair 53 centered from side-to-side and provides comfort of both seats 52 and 53 together. A person could actually sleep and wait all night for an early morning opportunity with this four-way safety lounge chair arrangement. One needn't climb in the early morning when the climbing would scare away wild life. It also gives one a head start of other hunters on the first day of hunting season.

A safety line would also be advisable. But the cradling effect of the four-way safety lounge chair is safer than a baby in a high chair and can be made almost as comfortable as a bed.

All of this comfort, safety, convenience and light weight are made possible by the unique constructional relationship of parts of this invention.

As an aid to levelling frames 8 and 9, turnbuckle length adjusters 56 can be provided in tree hugging arms 6. The turnbuckle length adjusters 56 can be large in diameter to provide leverage for easy turning. But they can be hollow and light except at inside thread sections. Use of a turnbuckle with its additional weight also is made possible by the light weight per strength of this invention. Turnbuckles are particularly desirable for the ultra light-weight and ultra comfortable embodiments of this invention. With all of its comfort and convenience amenities, it can weigh less per strength than any other hunting tree stand.

Referring to FIG. 14, a wire mesh floor 57 can be provided for light-weight rigidity. It can be used in conjunction with whatever top 1 construction is desired. If all of the edges of the wire mesh floor 57 are attached rigidly by welding or other means, it adds corner rigidity to the frame 8 for those who desire such construction.

Referring to FIG. 15, a tree engagement member 4 can be provided with engagement arms 58 for use with extra wide frames 8 and 9 to climb trees with larger diameters than usual. The engagement arms 58 would be advantageous because it would be difficult for a user to reach the arm attachment orifices 25 near opposite sides of large trees.

Referring to FIGS. 16 and 17, tree piercing prongs 5 can be provided with tree pierce covers 59 for uses such as increasing sharpness, decreasing sharpness and providing replaceable sanitary points. In FIG. 17, an entrance depth shield 60 is illustrated. It can be provided with a rubber or other resilient shield 61. Either of these may be required for different jurisdictions. Either are made possible with either type of tree piercing prong employed with this invention.

Various modifications may be made of the invention without departing from the scope thereof and it is desired, therefore, that only such limitations shall be placed thereon as are imposed by the prior art and which are set forth in the appended claims.

What is claimed is:

1. A hunting tree stand comprising:
a rectangular top frame having parallel sides, an outside end and an inside end;
a tree piercing prong at each side of the rectangular top frame having a proximal end attached to each side of the rectangular top frame and a central portion attached to the inside end of the rectangular top frame in triangular brace relationship to inside end corners of the rectangular top frame;
a distal end of each tree piercing prong extended a select distance from the inside end of the rectangular top frame in a proximate direction of a leg of a triangle formed by the triangular brace relationship of the tree piercing prong to each inside end corner of the rectangular top frame;
a selectively sharp tree piercing point at the distal end of each tree piercing prong on the rectangular top frame;
a top frame tree hugging arm having a proximal end pivotally attachable to each side of the rectangular top frame at a select distance from the outside end of the rectangular top frame;
an arm brace having a proximal end pivotally attachable to each side of the rectangular top frame proximate the inside end of the rectangular top frame and a distal end pivotally attachable to each tree hugging arm in an operational mode triangular brace relationship between the arm brace, the tree hugging arm and each side of the rectangular top frame;
a fold up attachment means on each tree hugging arm of the rectangular top frame positioned at a distance from the proximal end of each tree hugging arm that is proximate a length between proximal attachment of the arm brace to each side of the rectangular top frame and distal attachment of the arm brace to each tree hugging arm of the rectangular top frame;
a tree engagement member attachable to distal ends of the top frame tree hugging arms;
a rectangular bottom frame having parallel sides, an outside end and an inside end;
the rectangular bottom frame being proximate the same size as the rectangular top frame in desired relationship to diameters of trees;
a tree piercing prong at each side of the rectangular bottom frame having a proximal end attached to each side of the rectangular bottom frame and a central portion attached to the inside end of the rectangular bottom frame in triangular brace relationship to inside end corners of the rectangular bottom frame;
a distal end of each tree piercing prong extended a select distance from the inside end of the rectangular bottom frame in a proximate direction of a leg of a triangle formed by the triangular brace relationship of the tree piercing prong to each inside end corner of the rectangular bottom frame;
a selectively sharp tree piercing point at the distal end of each tree piercing prong on the rectangular bottom frame;

a bottom frame tree hugging arm having a proximal end pivotally attachable to each side of the rectangular bottom frame at a select distance from the outside end of the rectangular bottom frame;

an arm brace having a proximal end pivotally attachable to each side of the rectangular bottom frame proximate the inside end of the rectangular bottom frame and a distal end pivotally attachable to each tree hugging arm in an operational mode triangular brace relationship between the arm brace, the tree hugging arm and each side of the rectangular bottom frame;

a fold up attachment means on each tree hugging arm of the rectangular bottom frame positioned at a distance from the proximal end of each tree hugging arm that is proximate a length between proximal attachment of the arm brace to each side of the rectangular bottom frame and distal attachment of the arm brace to each tree hugging arm of the rectangular bottom frame;

a tree engagement member attachable to distal ends of the bottom frame tree hugging arms;

a floor on the rectangular bottom frame; and a foot harness on the rectangular bottom frame.

2. A hunting tree stand according to claim 1 wherein the top rectangular frame and the bottom rectangular frame are square tube metallic members.

3. A hunting tree stand according to claim 2 wherein the floor on the rectangular bottom frame is comprised of square tube metallic members extended from side-to-side of the bottom rectangular frame at select distances apart.

4. A hunting tree stand according to claim 1 wherein the tree piercing prongs are rectangular hard members bevelled upwardly from a pointed distal end.

5. A hunting tree stand according to claim 3 wherein the foot harness on the rectangular bottom frame is a toe strap sized, shaped and positioned on at least one of the square tube metallic members of the floor to fit over front parts of each of two shoes of an individual and a heel strap positional from side-to-side of the bottom frame tree hugging arms selectively near the toe strap in a direction of the outside end of the bottom rectangular frame.

6. A hunting tree stand according to claim 3 wherein the tree engagement member attachable to the distal ends of the top frame tree hugging arms and the tree engagement member attachable to the distal ends of the bottom frame tree hugging arms are comprised of square tube metallic members bent in a select curvature and having a means for curvature reversible attachment to the distal ends of the respective top frame and bottom frame tree hugging arms.

7. A hunting tree stand according to claim 1 and further comprising:

tree piercing points covers designed for select different objectives of retarding entry of the tree piercing points into trees, facilitating entry of the tree piercing points into trees, changing direction of entry of the tree piercing points into trees, providing a relatively soft and broad surface in place of the tree piercing points for contact with trees, compensation for different tree diameters and, providing sanitary surfaces of tree piercing points, in accordance with advantages for various types of trees, in accordance with various legal requirements and in accordance with personal desires of users.

8. A hunting tree stand according to claim 1 and further comprising:

a leveling means for adjusting levelness of the top rectangular frame and the bottom rectangular frame.

9. A hunting tree stand according to claim 8 wherein the leveling means is comprised of a succession of bolt holes in desired spaced relationships beginning proximate the distal ends and proceeding towards the proximal ends of the respective tree hugging arms of the top rectangular frame and the bottom rectangular frame and matching bolt holes in opposite ends of the respective tree engagement members of the top rectangular frame and the bottom rectangular frame such that distances of the respective top rectangular frame and bottom rectangular frame from a tree between the tree piercing points and the tree engagement members can be altered and level of the said frames adjusted consequently by attachment of the tree engagement members to said bolt holes nearer distal ends of said tree hugging arms for lowering the outside ends of the said frames and by attachment of the tree engagement members farther from distal ends of said tree hugging arms for raising the outside ends of the said frames.

10. A hunting tree stand according to claim 8 wherein the leveling means is a turnbuckle in each tree hugging arm.

11. A hunting tree stand according to claim 1 and further comprising:

a swing board seat suspendable on flexible lines from opposite sides of the top rectangular frame in a desired position between opposite ends of the top rectangular frame.

12. A hunting tree stand according to claim 1 and further comprising:

backpack straps having shoulder ends attachable to a bottom side of the inside end of the rectangular bottom frame and waist ends of the backpack straps attachable to a bottom of the outside end of the rectangular bottom frame; and a means for attachment of the rectangular top frame to a top side of the rectangular bottom frame when the rectangular bottom frame and the rectangular top frame are assembled in backpack mode.

13. A hunting tree stand according to claim 12 wherein the means for attachment of the rectangular top frame to the top side of the rectangular bottom frame is a resilient strap positional over each end of the rectangular top frame from side-to-side of the rectangular bottom frame.

14. A hunting tree stand according to claim 1 and further comprising:

a seat and armrest platform constructed of suitably smooth and soft material positional selectively on the outside end and the inside end of the top rectangular frame.

15. A hunting tree stand according to claim 1 and further comprising:

a side-to-side flexible seat comprised of flexible material suspendable from a loop attachment to opposite sides of the top rectangular frame such that the flexible seat is positional selectively between opposite ends of the rectangular top frame.

16. A hunting tree stand according to claim 15 and further comprising:

an end-to-end flexible seat comprised of flexible material suspendable from opposite ends of the top rectangular frame such that one of the flexible seats is positional on top of the other for providing four directional seating with a backrest and a central restrainer in all four directions to maximize comfort and to decrease danger of falling from the hunting tree stand in the event of fatigue and sleep of an individual user.

17. A hunting tree stand according to claim 1 wherein the floor is a mesh attached to both sides and to both ends of the rectangular bottom frame.

18. A hunting tree stand according to claim 17 wherein the mesh is flexible with weight on the floor being supportable linearly to material components of the mesh.

19. A hunting tree stand comprising:
   a rectangular top frame comprised of square tube metallic members forming parallel sides, an outside end and an inside end;
   a tree piercing prong at each side of the rectangular top frame comprised of a square tube metallic member having a proximal end attached to each side of the rectangular top frame and a central portion attached to the inside end of the rectangular top frame in triangular brace relationship to inside end corners of the rectangular top frame;
   a distal end of each tree piercing prong extended a select distance from the inside end of the rectangular top frame in a proximate direction of a leg of a triangle formed by the triangular brace relationship of the tree piercing prong to each inside end corner of the rectangular top frame;
   a selectively sharp tree piercing point at the distal end of each tree piercing prong on the rectangular top frame;
   a top frame tree hugging arm comprised of a square tube metallic member having a proximal end pivotally attachable to each side of the rectangular top frame at a select distance from the outside end of the rectangular top frame;
   an arm brace having a proximal end pivotally attachable to each side of the rectangular top frame proximate the inside end of the rectangular top frame and a distal end pivotally attachable to each tree hugging arm in an operational mode triangular brace relationship between the arm brace, the tree hugging arm and each side of the rectangular top frame;
   a fold up attachment means on each tree hugging arm of the rectangular top frame positioned at a distance from the proximal end of each tree hugging arm that is proximate a length between proximal attachment of the arm brace to each side of the rectangular top frame and distal attachment of the arm brace to each tree hugging arm of the rectangular top frame;
   a tree engagement member attachable to distal ends of the top frame tree hugging arms;
   a rectangular bottom frame comprised of square tube metallic members having parallel sides, an outside end and an inside end;
   the rectangular bottom frame being proximate the same size as the rectangular top frame in desired relationship to diameters of trees;
   a tree piercing prong at each side of the rectangular bottom frame comprised of a square tube metallic member having a proximal end attached to each side of the rectangular bottom frame and a central portion attached to the inside end of the rectangular bottom frame in triangular brace relationship to inside end corners of the rectangular bottom frame;
   a distal end of each tree piercing prong extended a select distance from the inside end of the rectangular bottom frame in a proximate direction of a leg of a triangle formed by the triangular brace relationship of the tree piercing prong to each inside end corner of the rectangular bottom frame;
   a selectively sharp tree piercing point at the distal end of each tree piercing prong on the rectangular bottom frame;
   a bottom frame tree hugging arm comprised of square tube metallic members having a proximal end pivotally attachable to each side of the rectangular bottom frame at a select distance from the outside end of the rectangular bottom frame;
   an arm brace having a proximal end pivotally attachable to each side of the rectangular bottom frame proximate the inside end of the rectangular bottom frame and a distal end pivotally attachable to each tree hugging arm in an operational mode triangular brace relationship between the arm brace, the tree hugging arm and each side of the rectangular bottom frame;
   a fold up attachment means on each tree hugging arm of the rectangular bottom frame positioned at a distance from the proximal end of each tree hugging arm that is proximate a length between proximal attachment of the arm brace to each side of the rectangular bottom frame and distal attachment of the arm brace to each tree hugging arm of the rectangular bottom frame;
   a tree engagement member attachable to distal ends of the bottom frame tree hugging arms;
   a floor comprised of square tube metallic members extended from side-to-side of the rectangular bottom frame at select distances apart;
   a foot harness comprised of a toe strap sized, shaped and positioned on at least one of the square tube metallic members of the floor to fit over front parts of each of two shoes of an individual and a heel strap positional from side-to-side of the bottom frame tree hugging arms at a position selectively near the toe strap in a direction of the outside end of the bottom rectangular frame;
   backpack straps having shoulder ends attachable to a bottom side of the inside end of the rectangular bottom frame and waist ends of the backpack straps attachable to a bottom of the outside end of the rectangular bottom frame;
   a means for attachment of the rectangular top frame to a top side of the rectangular bottom frame when the rectangular bottom frame and the rectangular top frame are assembled in backpack mode; and
   a seat suspendable from the top rectangular frame.

20. A hunting tree stand according to claim 19 and further comprising:
   a leveling means comprised of a succession of bolt holes in desired spaced relationships beginning proximate the distal ends and proceeding towards the proximal ends of the respective tree hugging arms of the top rectangular frame and the bottom rectangular frame and matching bolt holes in opposite ends of the respective tree engagement members of the top rectangular frame and the bottom rectangular frame, such that distances of the respective top rectangular frame and bottom rectangular frame from a tree between the tree piercing points and the tree engagement member can be altered and level of the said frames adjusted by attachment of the tree engagement members to said bolt holes nearer distal ends of said tree hugging arms for lowering the outside ends of the said frames and by attachment of the tree engagement members farther from distal ends of said tree hugging arms for raising the outside ends of the said frames.

21. A hunting tree stand according to claim 19 and further comprising:
a leveling means comprised of a turnbuckle in each tree hugging arm.

22. A hunting tree stand according to claim 20 and further comprising:
a leveling means comprised of a turnbuckle in each tree hugging arm; and
said tree engagement member having a tree engagement form with parallel extensions attachable to tree hugging arms of the rectangular top frame and the rectangular bottom frame at the succession of bolt holes in the said tree hugging arms.

23. A hunting tree stand according to claim 19 wherein the seat is comprised of a swing board seat suspendable on flexible lines from opposite sides of the top rectangular frame in a desired position midway between opposite ends of the top rectangular frame.

24. A hunting tree stand according to claim 19 wherein the seat is a side-to-side flexible fabric suspendable from a loop attachment to opposite sides of the top rectangular frame such that the flexible fabric seat is positional selectively between opposite ends of the rectangular top frame and an end-to-end flexible fabric suspendable from opposite ends of the top rectangular frame such that one of the flexible fabrics is positional on top of the other for providing four directional seating with a back rest and a central restrainer in all four directions to maximize comfort and to decrease danger of falling from the hunting tree stand in the event of fatigue and sleep of a individual user.

25. A hunting tree stand according to claim 19 and further comprising:
tree piercing points covers designed for select different objectives of retarding entry of the tree piercing points into trees, facilitating entry of the tree piercing points into trees, changing direction of entry of the tree piercing points into trees, providing a relatively soft and broad surface in place of the tree piercing points for contact with trees, compensating for different tree diameters and, providing sanitary surfaces of tree piercing points in accordance with advantages for various types of trees, in accordance with various legal requirements and in accordance with personal desires of users.

26. A hunting tree stand according to claim 19 and further comprising:
a seat and armrest platform constructed of suitably smooth and soft material positional selectively on the outside end and the inside end of the top rectangular frame.

27. A hunting tree stand according to claim 19 wherein the tree piercing prong are rectangular hard members bevelled upwardly from a pointed distal end.

28. A hunting tree stand comprising:
a rectangular top frame comprised of parallel sides, an outside end and an inside end;
a tree piercing prong at each side of the rectangular top frame having a proximal end attached to each side of the rectangular top frame and a central portion attached to the inside end of the rectangular top frame in triangular brace relationship to inside end corners of the rectangular top frame;
a distal end of each tree piercing prong extended a select distance from the inside end of the rectangular top frame in a proximate direction of a leg of a triangle formed by the triangular brace relationship of the tree piercing prong to each inside end corner of the rectangular top frame;
a selectively sharp tree piercing point at the distal end of each tree piercing prong on the rectangular top frame;
a top frame tree hugging arm having a proximal end pivotally attachable to each side of the rectangular top frame at a select distance from the outside end of the rectangular top frame;
an arm brace having a proximal end pivotally attachable to each side of the rectangular top frame proximate the inside end of the rectangular top frame and a distal en pivotally attachable to each tree hugging arm in an operational mode triangular brace relationship between the arm brace, the tree hugging arm and each side of the rectangular top frame;
a fold up attachment means on each tree hugging arm of the rectangular top frame positioned at a distance from the proximal end of each tree hugging arm that is proximate a length between proximal attachment of the arm brace to each side of the rectangular top frame and distal attachment of the arm brace to each tree hugging arm of the rectangular top frame;
a tree engagement member attachable to distal ends of the top frame tree hugging arms;
a rectangular bottom frame having parallel sides, an outside end and an inside end;
the rectangular bottom frame being proximate the same size as the rectangular top frame in desired relationship to diameters of trees;
a tree piercing prong at each side of the rectangular bottom frame having a proximal end attached to each side of the rectangular bottom frame and a central portion attached to the inside end of the rectangular bottom frame in triangular brace relationship to inside end corners of the rectangular bottom frame;
a distal end of each tree piercing prong extended a select distance from the inside end of the rectangular bottom frame in a proximate direction of a leg of a triangle formed by the triangular brace relationship of the tree piercing prong to each inside end corner of the rectangular bottom frame;
a selectively sharp tree piercing point at the distal end of each tree piercing prong on the rectangular bottom frame;
a bottom frame tree hugging arm having a proximal end pivotally attachable to each side of the rectangular bottom frame at a select distance from the outside end of the rectangular bottom frame;
an arm brace having a proximal end pivotally attachable to each side of the rectangular bottom frame proximate the inside end of the rectangular bottom frame and a distal end pivotally attachable to each tree hugging arm in an operational mode triangular brace relationship between the arm brace, the tree hugging arm and each side of the rectangular bottom frame;

a fold up attachment means on each tree hugging arm of the rectangular bottom frame positioned at a distance from the proximal end of each tree hugging arm that is proximate a length between proximal attachment of the arm brace to each side of the rectangular bottom frame and distal attachment of the arm brace to each tree hugging arm of the rectangular bottom frame;

a tree engagement member attachable to distal ends of the bottom frame tree hugging arms;

a flexible mesh floor attached to both sides and to both ends of the rectangular bottom frame such that weight on the floor is supportable linearly to material components of the mesh;

a foot harness comprised of a toe strap sized, shaped and positioned on the rectangular bottom frame to fit over front parts of each of two shoes of an individual and a heel strap positional selectively near the toe strap in a direction of the outside end of the bottom rectangular frame;

backpack straps having shoulder ends attachable to a bottom side of the inside end of the rectangular bottom frame and waist ends of the backpack straps attachable to a bottom of the outside end of the rectangular bottom frame;

a means for attachment of the rectangular top frame to a top side of the rectangular bottom frame when the rectangular bottom frame and the rectangular top frame are assembled in backpack mode; and a seat suspendable from the top rectangular frame.

29. A hunting tree stand according to claim 28 and further comprising:

a leveling means comprised of a succession of bolt holes in desired spaced relationships beginning proximate the distal ends and proceeding towards the proximal ends of the respective tree hugging arms of the top rectangular frame and the bottom rectangular frame and matching bolt holes in opposite ends of the respective tree engagement members of the top rectangular frame and the bottom rectangular frame, such that distances of the respective top rectangular frame and bottom rectangular frame from a tree between the tree piercing bolts and the tree engagement member can be altered and level of the said frames adjusted by attachment of the tree engagement members to said bolt holes nearer distal ends of said tree hugging arms for lowering the outside ends of the said frames and by attachment of the tree engagement members farther from distal ends of said tree hugging arms for raising the outside ends of the said frames.

30. A hunting tree stand according to claim 28 and further comprising:

a leveling means comprised of a turnbuckle in each tree hugging arm.

31. A hunting tree stand according to claim 29 and further comprising:

a leveling means comprised of a turnbuckle in each tree hugging arm; and said tree engagement member having a tree engagement form with parallel extensions attachable to the tree hugging arms of the rectangular top frame and the rectangular bottom frame at the succession of bolt holes in the said tree hugging arms.

32. A hunting tree stand according to claim 28 wherein the seat is comprised of a swing board seat suspendable on flexible lines from opposite sides of the top rectangular frame in a desired position midway between opposite ends of the top rectangular frame.

33. A hunting tree stand according to claim 28 wherein the seat is a side-to-side flexible fabric suspendable from a loop attachment to opposite sides of the top rectangular frame such that the flexible fabric seat is positional selectively between opposite ends of the rectangular top frame and an end-to-end flexible fabric suspendable from opposite ends of the top rectangular frame such that one of the flexible fabrics is positional on top of the other for providing a four directional seating with a back rest and a central restrainer in all four directions to maximize comfort and to decrease danger of falling from the hunting tree stand in the event of fatigue and sleep of an individual user.

34. A hunting tree stand according to claim 28 and further comprising:

tree piercing points covers designed for select different objectives of retarding entry of the tree piercing points into trees, facilitating entry of the tree piercing points into trees, changing direction of entry of the tree piercing points into trees, providing a relatively soft and broad surface in place of the tree piercing points for contact with trees, compensating for different tree diameters and, providing sanitary surfaces of tree piercing points in accordance with advantages for various types of trees, in accordance with various legal requirements and in accordance with personal desires of users.

35. A hunting tree stand according to claim 28 and further comprising:

a seat and armrest platform constructed of suitably smooth and soft material positional selectively on the outside end and the inside end of the top rectangular frame.

36. A hunting tree stand according to claim 28 wherein the tree piercing prongs are rectangular hard members bevelled upwardly from a pointed distal end.

* * * * *